United States Patent [19]
von Dulong et al.

[11] Patent Number: 4,655,426
[45] Date of Patent: Apr. 7, 1987

[54] ADJUSTABLE LEG FOR SUPPORTING A TABLE

[75] Inventors: F. Olaf von Dulong, Nixa, Mo.; Richard W. Herr, Marathon, Fla.

[73] Assignee: Eutec Ltd., Minitonas, Canada

[21] Appl. No.: 755,323

[22] PCT Filed: Nov. 7, 1984

[86] PCT No.: PCT/US84/01821
§ 371 Date: Jun. 24, 1985
§ 102(e) Date: Jun. 24, 1985

[87] PCT Pub. No.: WO85/02242
PCT Pub. Date: May 23, 1985

[30] Foreign Application Priority Data
Nov. 7, 1983 [GB] United Kingdom ............... 8329695

[51] Int. Cl.$^4$ ............................................. F16M 11/00
[52] U.S. Cl. ..................................... 248/405; 248/422; 108/147
[58] Field of Search ............... 248/405, 161, 406.1, 248/404, 425, 354.3, 406.2, 422; 108/147; 254/7 R, 97, 98

[56] References Cited
U.S. PATENT DOCUMENTS
1,324,721 12/1919 Benedict ............................ 254/97
3,927,863 12/1975 Polsky ............................... 248/354.3
4,493,469 1/1985 Hofobaugh ..................... 108/147
4,519,236 5/1985 Celette ............................ 248/354.3
4,552,403 11/1985 Yindra ............................. 248/422

FOREIGN PATENT DOCUMENTS
82272 7/1895 Fed. Rep. of Germany ... 248/406.1
947877 8/1956 Fed. Rep. of Germany ... 248/354.3
496911 12/1938 United Kingdom ............... 248/422
750919 6/1956 United Kingdom ............ 248/354.3

Primary Examiner—Reinaldo P. Machado
Assistant Examiner—Alvin Chin-Shue
Attorney, Agent, or Firm—Breneman, Georges, Hellwedge & Yee

[57] ABSTRACT

An adjustable leg for supporting a table top whereby the height can be raised or lowered comprises a metal tube defining the leg within which is mounted a screw threaded rod. A square opening in one side of the wall of the tube exposes the teeth of a gear member which can be rotated and carries a screw thread for cooperation with the rod to raise and lower the table top. Collars on either side of the gear member provide bearing surfaces for axial movement of the rod and for rotational movement of the gear member. The gear member can have two separate axially spaced sets of teeth, one for cooperation with an electric motor drive gear and the other for cooperation with a manually operable ratchet device. The ratchet device and electric motor are alternatives and each of which can be mounted in a housing for clamping around the tubular leg.

8 Claims, 6 Drawing Figures

ADJUSTABLE LEG FOR SUPPORTING A TABLE

BACKGROUND OF THE INVENTION

This invention relates to an adjustable leg for supporting a table top whereby the height of the table top can be raised or lowered. The expression table top is intended to include any substantially horizontal surface which can support objects such as various sorts of table, television tables, desk tops and other surfaces for supporting for example typewriters and computer terminals.

Tables and desks particular for use with computer terminals and other equipment which includes keyboards or other devices which require close attention and manual operation need to be adjusted acurately to the required height of the individual using the equipment. In view of the large increase in usage of of such equipment there has developed a particular demand for tables of this type with the need for a rapid and accurate adjustment of the height particularly of the table itself which may or may not carry associated equipment attached to the table.

Various prior arrangements have been proposed for adjustable table tops generally comprising a single leg which has a screw or rack which can be raised or lowered by operation of a suitable actuating mechanism.

For example U.S. Pat. No. 944,560 provides a height adjustment mechanism in the form of an extension portion carrying a rack which is raised and lowered relative to a leg by a pinion and a manually rotatable handle carried on the leg.

U.S. Pat. Nos. 1,783,661 and 3,030,073 provide an externally screw threaded extension portion with a pedestal on which is mounted a hand wheel which surrounds the screw threaded portion and can be manually turned to raise the screw threaded portion to raise the table top.

However these arrangements are complex and therefore expensive to manufacture and are visually unappealing. Furthermore in view of the large number of parts involved they tend to be somewhat unstable and prone to wear between the various parts whereby the desired smooth action and accurate control can be lost.

SUMMARY OF THE INVENTION

It is one object of the present invention, therefore, to provide an improved leg of this general type for raising a table top which is manufactured simply from a limited number of parts which are stably and accurately maintained in position and therefore provide an accurate and smooth movement.

According to the invention, therefore, there is provided a leg for supporting a table top the height of which can be varied comprising a support tube for mounting substantially vertically and defining an outer surface of the leg, an externally screw threaded rod mounted within the support tube for supporting on an upper end thereof the table top and arranged so as to be axially movable from a retracted position at least partially within the tube to an extended position to raise said table top, an opening in said tube extending over a part only of the periphery and length thereof, a toothed gear member having peripherally mounted axially extended teeth and mounted within said tube so as to surround said rod such that the teeth thereof over a part of the periphery thereof are exposed at said opening, said gear member including an internal screw thread for cooperating with said externally screw threaded rod, means for driving said exposed teeth for rotating said gear member and collar means within the tube surrounding the rod and including means for preventing rotational movement of said collar relative to said tube and relative to said rod while allowing said axial movement and arranged to retain said gear member against axial movement whereby said rotation thereof acts to move said rod axially to said retracted and extended positions.

According to a particularly preferred arrangement the toothed gear member provides a first portion and a second portion axially spaced from the first both of which present teeth at the opening with one of the portions being arranged for cooperation with a ratchet drive device and therefore has generally rectangular teeth and a second portion is arranged for cooperation with a gear wheel and therefore has gear type teeth.

In this way a leg can be manufactured simply and yet used either for drive motor actuation or for manual lever actuation, the latter using a ratchet drive member.

The ratchet drive member can include a manual lever which reciprocates around an arc of the tube in a radial plane with the extent of the arc being defined by the peripheral extent of the opening.

A pawl having a visual portion in the shape of an arrow can be rotated through 180° so that when moved by the manually operable lever it drives the gear member either in a direction to raise or to lower the rod depending upon the direction of the arrow of the pawl.

The leg can be simply formed from a steel or aluminum tube with the collars formed of plastics materials one on either side of the gear member and providing bearing surfaces for the gear member and for the axial movement of the rod.

The leg therefore in the form of the tube presents a pleasing appearance and the opening can be covered by a housing clamped around the leg at a position spaced from both ends of the leg, the housing being shaped and arranged to contain the manually actuable ratchet and lever device or the electric drive motor depending upon requirements.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
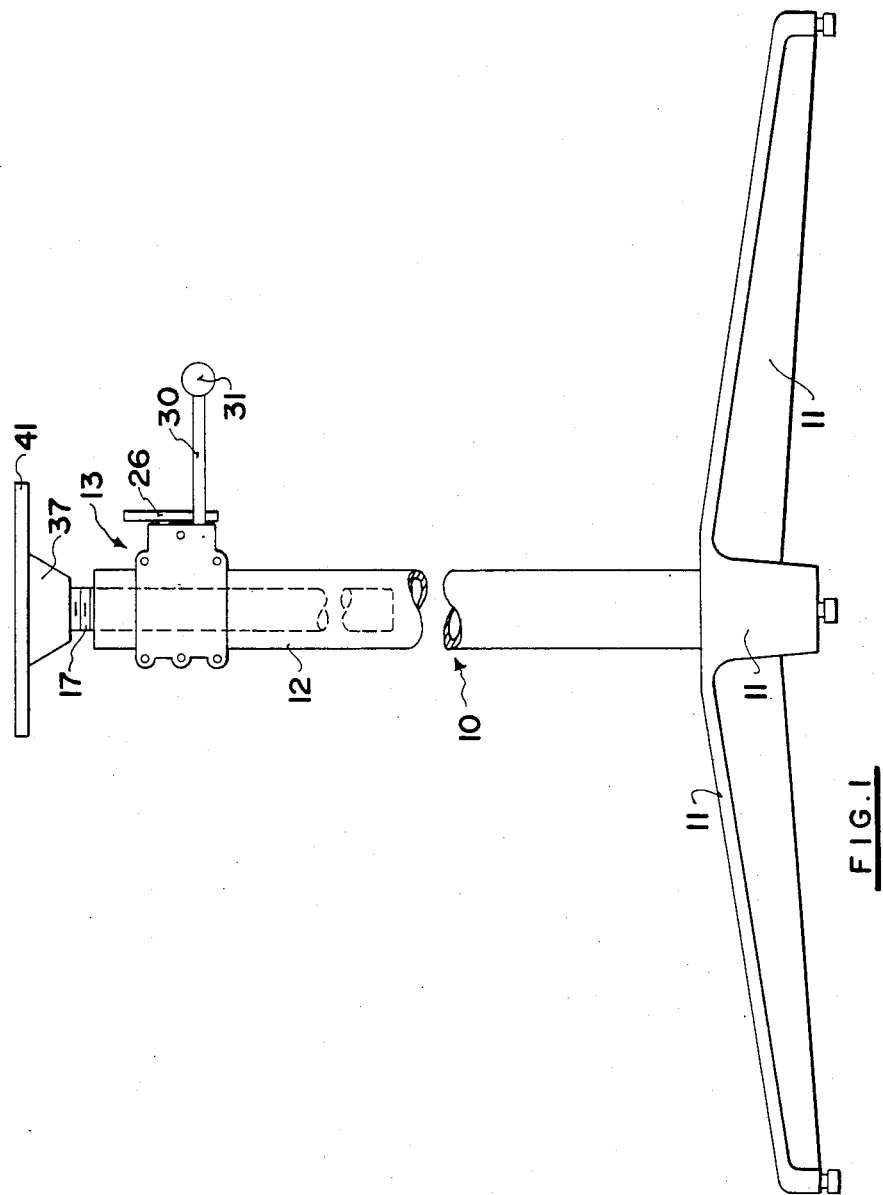
FIG. 1 is a side elevational view partly in cross-section of an elevating device for a table or desk.

The table support including the elevating device shown in FIG. 1 and comprising a steel or aluminum tubular column or leg 10 with feet 11 arranged at the bottom extending outwardly from the central column to provide a support for the central column to retain it vertically. The feet can include castors if required with means for braking the castor wheels to retain the support in a particular chosen position after adjustment on the castor wheels. For convenience of illustration, the castor wheels and braking mechanism are not illustrated. Alternatively the leg can be clamped by means (not shown) to a table or desk for supporting an associated adjustable surface.

Figure 2:
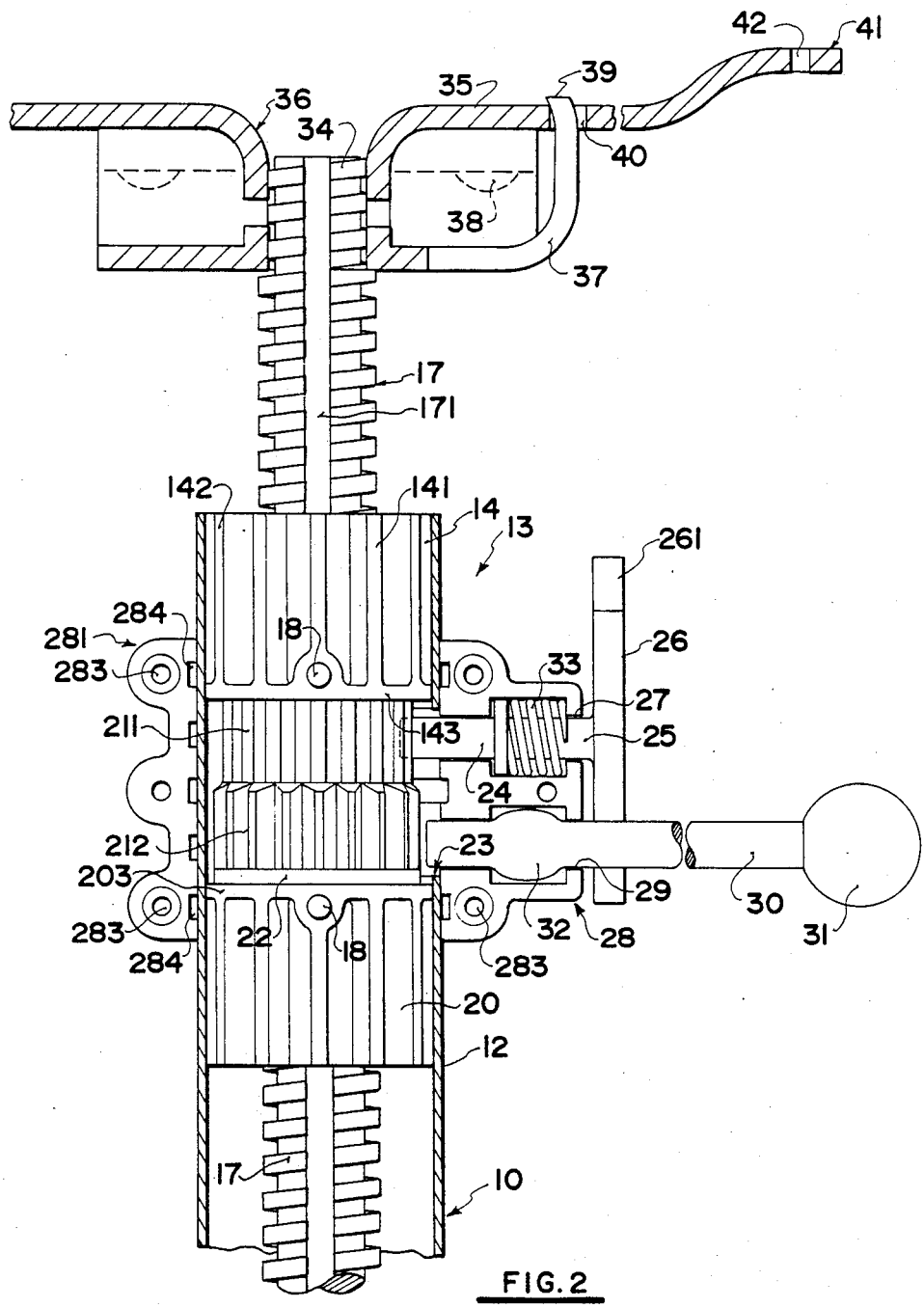
FIG. 2 is a side elevational view of the lifting portion of the device of FIG. 1 with one half of the housing and the outer surface of the tubular leg broken away.

In FIG. 2, the lower part of the tubular leg 10 is illustrated in side elevational view whereas an upper part is shown broken away and it will be noted that the tubular column or leg comprises a relatively thin walled tube 12 for receiving a height adjustment mechanism generally indicated at 13 within the upper part of the tube 12.

Figure 3:
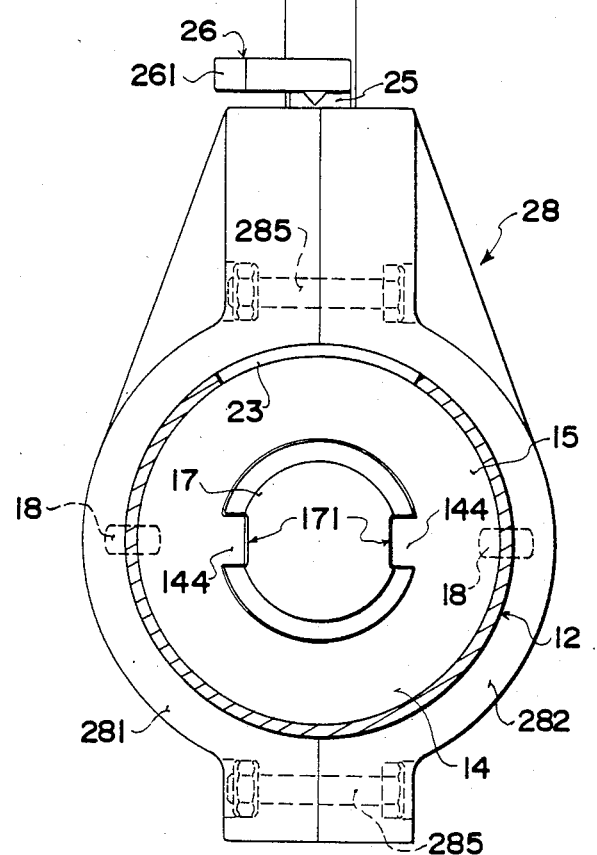
FIG. 3 is a plan view of the device of FIG. 1 with the upper table support device removed.

The height adjustment mechanism comprises a first fixed collar 14 which closes the upper open end of the tube 12 and provides an upper annular face 15 as shown in FIG. 3 with a central hole 16 for receiving a screw rod 17. The collar 14 is located in the tube 12 and held against rotational and axial movement by pins 18 and 19 which pass through the wall of the tube 12 and provide a stud on the outer surface thereof. The collar 14 is manufactured from a central cylindrical portion 141 and a plurality of splines extending radially outwardly from the cylindrical portion and indicated at 142.

A second fixed collar 20 is positioned in the upper part of the tube 12 spaced from the collar 14 and again is of the same construction as the collar 14 and is locked in position by pins 18 and 19.

The bottom face of the collar 14 is provided by a plate 143 which provides a planar lower face of annular shape surrounding the screw 17. The upper face 203 of the lower collar 20 is of the same construction. The faces 143 and 203 provide bearing surfaces for rotational movement of a central gear member 21 which spans the gap between the collars 14 and 20 and is held against axial movement by the collars 14 and 20. The member 21 is however free to rotate about the axis of the tube 12. A washer 22 is positioned between the upper face 203 and the bottom surface of the member 21 in order to accommodate axial loads communicated between the member 21 and the collar 20 while allowing the member 21 to rotate relative to the upper face 203 of the collar 20.

A rectangular opening 23 is provided in the tube 12 substantially coextensive in height with the member 21 and extending over a part of the periphery of the tube 12 as shown in FIG. 3 to provide access to the member 21 from the exterior of the tube 12. The member 21 has formed in the outer surface thereof a plurality of axially extending teeth 211 which provide a gear arrangement on the exterior surface thereof by which the member can be rotated. A second gear formed by axially extending teeth 212 is positioned side by side with the first on the member 21 so the member 21 effectively is formed by the two gears which are coupled together for co-rotation about the axis of the tube 12.

The screw 17 which passes through the collars 14 and 20 also passes through the member 21. The screw 17 includes a screw thread on the outer surface thereof. The screw 17 is arranged in sliding fit with the cylinder 141 of the collar 14 and with a similar cylinder of the collar 20 so that the screw 17 can move upwardly and downwardly in an axial direction relative to the collars 14 and 20 but is prevented from radial movement relative to the axis of the tube 12. The member 21 carries on inner surface a cooperating screw thread for engaging the screw thread 17. As shown in FIG. 3, the collar 14 provides a pair of axially extending inwardly projecting guides 144 which are integral with the collar 14 and hence are held against axial or rotational movement by the collar 14. The projections 144 cooperate with slots 171 cut axially of the screw thread 17 and having a depth equal to that of the screw thread whereby the screw is prevented from rotating relative to the tube 12. Rotation of the member 21, therefore, which is held against axial movement but allowed to rotate, causes axial movement of the screw 17 which is prevented from rotating but allowed to move axially.

Figure 4:
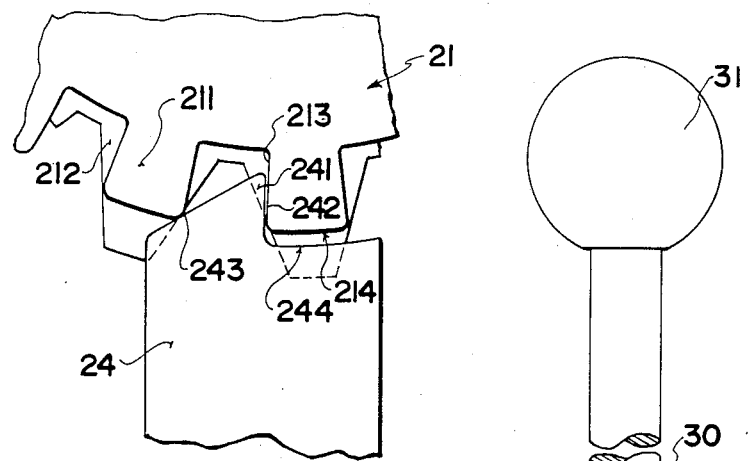
FIG. 4 is a cross-sectional view along the lines 4—4 in FIG. 1 on an enlarged scale showing the details of the ratchet mechanism.

Rotation of the member 21 is obtained by engagement of the gear formed by the substantially rectangular teeth or splines 211 with a ratchet device or pawl 24 which protrudes through the opening 23. The pawl 24 is shown in more detail in FIG. 4 in cooperation with the splines 211 of the collar 21. The pawl has a projecting nose 241 which projects into the spaces between the splines 211. The nose is formed by a side 242 which extends radially outwardly from the axis of the tube and therefore lies parallel to the edge 213 of the spline 211. The other face of the nose 241 is inclined away from the edge 213 to contact a corner of the next adjacent spline 211 and extends beyond that to lie on an arc 244 concentric with the axis of the tube and with the outer surface of the splines 211. The arc 244 forming the remainder of the front surface of the pawl 24 is spaced from the outer face 214 of the splines 211. In this way as the pawl moves in the clockwise position as shown in FIG. 4 it merely slides over the splines 211 without causing rotational movement of the collar 21 with the pawl being pushed away from the splines by the surface 243. However when moved in the anticlockwise direction as shown, the pawl acts to move the collar 21 in the same anticlockwise direction to move the screw 17 axially.

The pawl 24 is mounted on a pin 25 which includes an operating lever 26. The pin 25 is mounted in a channel 27 formed in a sleeve generally indicated at 28 which channel 27 allows the pin to be rotated through 180° by operation of the lever 26. Thus the pawl as shown in FIG. 4 can be turned through 180° so as to provide a ratchet effect in the opposite direction and to rotate the collar 21 in the clockwise direction. The operating lever 26 is offset from the pin 25 as shown best in FIG. 3 and when rotated through 180° is offset to the other side of the pin 25 as will be apparent. In order to indicate the direction of movement of the screw 17 in relation to the position of the pawl 24, the lever 26 includes an arrow or pointed end 261 which points up or down depending upon the orientation of the lever.

The sleeve member 28 surrounds the tube 12 and is basically formed from two half cylinders 281, 282 which can be screwed together through screw holes 283 and screws 285. The sleeve 28 has on its inner surface a number of peripheral channels 284 which act to retain grease to enable the sleeve to rotate around the tube 12. In addition the upper and lower channels 284 act as guides for the sleeve by cooperating with the studs 18 which slide in the channels 284.

The sleeve member 28 also includes a second radially extending channel 29 parallel to the channel 27 for receiving an operating lever 30 which extends outwardly beneath the pawl 24 and beyond the pawl 24 to a knob 31 which can be manually grasped. The lever 30 includes an enlargement 32 cooperating with an enlarged section of the channel 29 to retain the lever in position. It will be noted that the inner end of the lever 30 projects into the opening 23 and hence delimits the angular movement of the sleeve 28 around the tube 12. A similar enlargement in the channel 27 receives a spring 33 which acts to force the pawl 24 inwardly against the splines 211.

The upper end of the screw 17 (FIG. 1) is turned down to a diameter only slightly greater than the base of the screw thread over a section indicated at 34. This turned down section receives a metal support member 35 which is slightly dished and is turned down at a central opening 36 to provide a collar surrounding the section 34 of the screw 17. A cooperating supporting member 37 also includes a collar surrounding the section 34 and is riveted to the plate 35 by rivets 28 and includes lugs 39 which project through openings 40 in the plate 35. The plate 35 extends outwardly to a rim area 41 which has openings 42 for attaching the plate 35 to the undersurface of a panel forming a table or desk the upper surface of the panel thus can support working equipment such as a computer terminal and the height of it relative to the ground can be adjusted over very fine limits by moving the screw 17 upwardly and downwardly as previously described.

The panel (not shown) forming the surface of the desk or table can be of any suitable dimension and can include drawers or compartments as required. In addition a sliding arrangement positioned beneath the panel can be provided for receiving a keyboard or other similar equipment which can be slid forwardly and rearwardly so as to be exposed in the forward position for operation. The sliding arrangement can include a limited amount of height and/or angle adjustment to accommodate the individual user. In addition the panel can be tilted relative to the support to move to a position of comfort for the user.

In an alternative arrangement (not shown) an additional gear mechanism can be added to the lifting mechanism so that vertical actuation of the lever 31 causes rotational movement of the drive collar 21.

Figure 5:
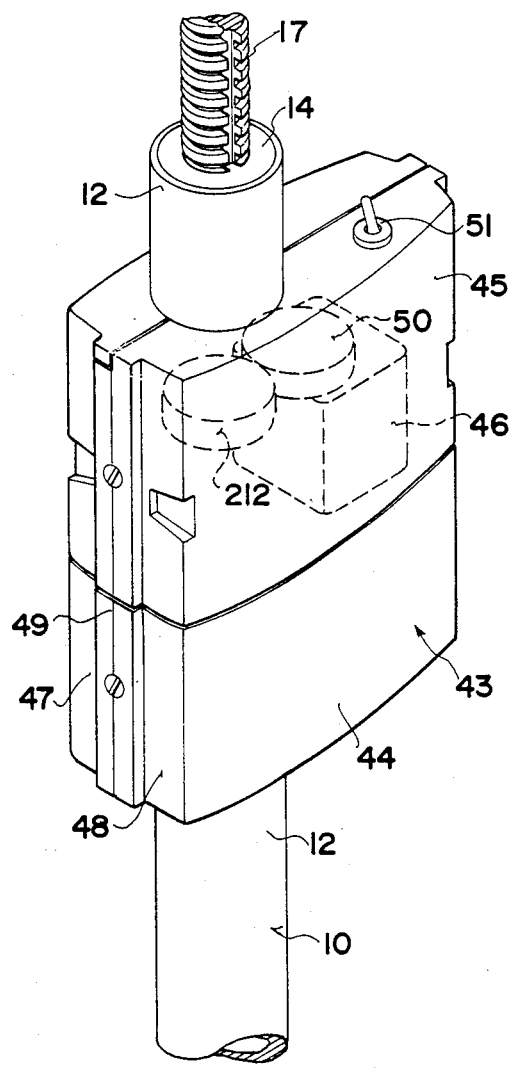
FIG. 5 is an isometric view of an electric drive motor arrangement for use with the leg of FIG. 1 in place of the manual lever device.
Figure 6:
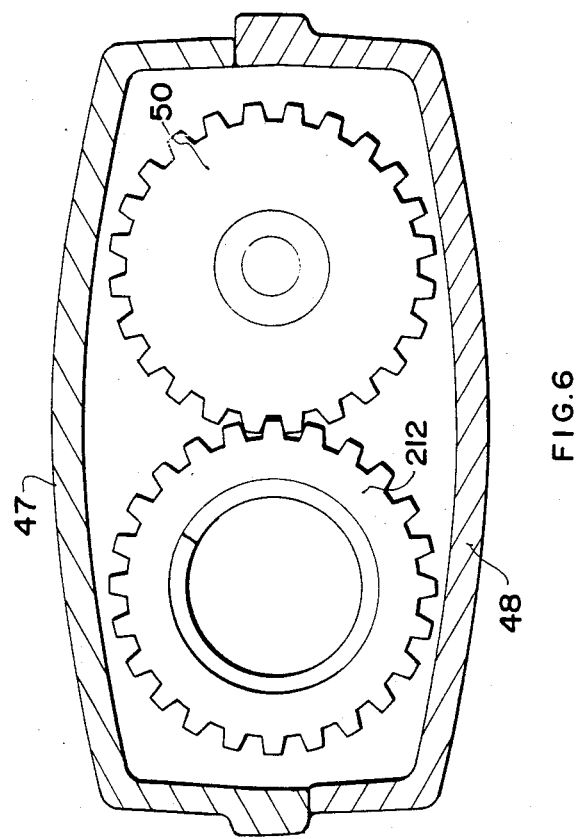
FIG. 6 is a cross-sectional view along the lines 6—6 of FIG. 5.

Turning now to FIGS. 5 and 6 there is shown the leg 10 and screw 17 of FIGS. 1 through 4 including an alternative drive arrangement which can be applied to the leg in place of the housing 28 and the associated pawl 24 and operating lever 30.

The drive arrangement comprises a housing 43 having a lower section 44 for a battery pack and an upper section 45 for housing a drive motor 46 shown schematically in phantom. The housing 43 is formed in two halves 47 and 48 with an overlapping lip 49 by which the halves can be screwed together at 50 to clamp the housing 43 around the tube 12.

The motor 46 carries a drive gear 50 which carries conventional gear drive teeth 51 for cooperation with the teeth 212 of the lower portion of the gear member 21. The teeth 212 are also visible in FIG. 4 where it will be noted that there are the same number of teeth in the section 212 as in the section 211 but the teeth are shaped with sloped sides as conventional gear drive teeth for cooperation with the drive gear 50 of the electric motor 46.

A toggle switch 51 is mounted on the upper portion of the housing as shown in FIG. 5 and is actuable to drive the motor to rotate the gear member 21 to raise or lower the screw 17. The switch 51 is thus a three position switch providing drive in both directions and also a stationary condition of the motor.

The battery pack can be optional and can be replaced by direct coupling to the mains supply.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A leg for supporting a table top the height of which can be varied comprising a support tube means for mounting substantially vertically, an externally screw threaded rod mounted within the support tube means axially thereof for supporting on an upper end thereof the table top and arranged so as to be axially movable from a retracted position at least partially within the tube means to an extended position to raise said table top, an opening in said tube at a position intermediate the length thereof and extending over a part only of the length thereof, a toothed gear member having peripherally mounted axially extending teeth and mounted within said tube means so as to surround said rod such that the teeth thereof over a part of a peripheral surface thereof are exposed at said opening, said gear member including an internal screw thread for cooperating with said externally screw threaded rod, a first and a second collar means each fixedly mounted within the tube means surrounding the rod and having an external surface in contact with an internal surface of said tube means, said rod having a longitudinal slot for engaging a projection of each of said collar means for preventing rotational movement of said rod relative to said collar means while allowing said axial movement, one of said collar means being mounted above said gear member and the other below said gear member to retain said gear member against axial movement whereby a rotation thereof acts to move said rod axially to said retracted and extended positions, a housing formed in two portions separated longitudinally of the tube means and arranged to clamp around the tube means at said opening, a manually operable lever mounted on said housing and arranged for reciprocation with said housing around an arc in a radial plane of the tube means, means limiting the angular extent of the arc, and a pawl mounted in said housing for reciprocation therewith for engaging said gear member and arranged to drive said gear member in one direction of reciprocation of said housing and to slip relative thereto in an opposed direction of the reciprocation of the housing, said pawl being rotatable about an axis at right angles to the leg through 180° so as to reverse the direction of drive and the direction of slip.

2. The invention according to claim 1 wherein the toothed gear member includes a first toothed portion arranged for cooperation with said pawl and a second toothed portion co-rotatable with the first and axially spaced from the first and arranged for cooperation with a rotatable drive device, both said first and second portions being exposed at said opening.

3. A leg for supporting a table top the height of which can be varied comprising support tube means for mounting substantially vertically, an externally screw threaded rod mounted within the support tube means axially thereof for supporting on an upper end thereof the table top and arranged so as to be axially movable from a retracted position at least partially within the tube means to an extended position to raise said table top, an opening in said tube means extending over a part only of length thereof, a toothed gear member having peripherally mounted axially extending teeth and mounted within said tube so as to surround said rod such that the teeth thereof over a part of the periphery thereof are exposed at said opening, said gear member including an internal screw thread for cooperating with said externally screw threaded rod, a first and a second collar means each fixedly mounted within the tube means surrounding the rod and having an external surface in contact with an internal surface of said tube means, said rod having a longitudinal slot for engaging a projection of each of said collar means for preventing rotational movement of said rod relative to said collar means while allowing said axial movement, one of said collar means being mounted above said gear member and the other below said gear member to retain said gear member against axial movement whereby said rotation thereof acts to move said rod axially to said retracted and extended positions, a housing formed in two portions separated longitudinally of the tube means and arranged to clamp around the tube means at said opening and drive means mounted in said housing for engaging and driving said exposed teeth, said toothed gear member including a first toothed portion arranged for cooperation with a first drive device and a second toothed portion co-rotatable with the first and axially spaced from the first and arranged for cooperation with a second drive device, both said first and second portions being exposed at said opening.

4. The invention according to claim 3 wherein the driving means comprises a motor having a gear wheel for driving said gear member.

5. The invention according to claim 3 wherein the driving means comprises a ratchet drive member including a pawl for engaging said gear member arranged to drive said gear member in one direction and to slip relative thereto in the opposite direction.

6. The invention according to claim 3 wherein said ratchet drive member comprises a manually operable lever arranged for reciprocation around an arc in a radial plane of the tube, the extent of the arc being defined by the peripheral extent of the opening.

7. The invention according to claim 3 wherein the pawl is rotatable about an axis at right angles to the leg through 180° so as to reverse the direction of drive and the direction of slip.

8. The invention according to claim 3 wherein the housing is spaced from both ends of the tube.

* * * * *